(12) United States Patent
Yamauchi

(10) Patent No.: US 10,193,143 B2
(45) Date of Patent: Jan. 29, 2019

(54) NEGATIVE ELECTRODE ACTIVE MATERIAL FOR ELECTRICITY STORAGE DEVICES AND METHOD FOR PRODUCING SAME

(71) Applicant: Nippon Electric Glass Co., Ltd., Shiga (JP)

(72) Inventor: Hideo Yamauchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 366 days.

(21) Appl. No.: 14/909,179

(22) PCT Filed: Aug. 4, 2014

(86) PCT No.: PCT/JP2014/070444
§ 371 (c)(1),
(2) Date: Feb. 1, 2016

(87) PCT Pub. No.: WO2015/019985
PCT Pub. Date: Feb. 12, 2015

(65) Prior Publication Data
US 2016/0164082 A1  Jun. 9, 2016

(30) Foreign Application Priority Data

Aug. 8, 2013 (JP) ................................. 2013-164717

(51) Int. Cl.

| | |
|---|---|
| *H01M 4/36* | (2006.01) |
| *H01M 4/48* | (2010.01) |
| *H01M 4/587* | (2010.01) |
| *C01G 23/00* | (2006.01) |
| *C04B 35/462* | (2006.01) |
| *C03C 3/14* | (2006.01) |
| *C03C 10/00* | (2006.01) |
| *C03B 32/02* | (2006.01) |
| *C04B 35/453* | (2006.01) |
| *H01M 4/485* | (2010.01) |
| *C03C 8/14* | (2006.01) |
| *H01M 10/0525* | (2010.01) |
| *H01M 4/62* | (2006.01) |
| *H01M 10/054* | (2010.01) |

(52) U.S. Cl.
CPC .......... *H01M 4/366* (2013.01); *C01G 23/005* (2013.01); *C03B 32/02* (2013.01); *C03C 3/14* (2013.01); *C03C 8/14* (2013.01); *C03C 10/0054* (2013.01); *C04B 35/453* (2013.01); *C04B 35/462* (2013.01); *H01M 4/364* (2013.01); *H01M 4/48* (2013.01); *H01M 4/485* (2013.01); *H01M 4/587* (2013.01); *C01P 2002/72* (2013.01); *C01P 2004/61* (2013.01); *C01P 2004/62* (2013.01); *C04B 2235/3201* (2013.01); *C04B 2235/3251* (2013.01); *C04B 2235/3267* (2013.01); *C04B 2235/3284* (2013.01); *C04B 2235/3293* (2013.01); *C04B 2235/3294* (2013.01); *C04B 2235/3298* (2013.01); *C04B 2235/3409* (2013.01); *C04B 2235/76* (2013.01); *C04B 2235/85* (2013.01); *H01M 4/625* (2013.01); *H01M 10/054* (2013.01); *H01M 10/0525* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 5,506,075 A | * | 4/1996 | Iwasaki ................. | H01M 4/485 429/221 |
| 5,618,640 A | * | 4/1997 | Idota ..................... | H01M 4/485 419/1 |
| 5,869,548 A | * | 2/1999 | Ikushima ............... | A61K 6/083 501/66 |
| 6,132,903 A | | 10/2000 | Fujimoto et al. | |
| 7,273,825 B2 | * | 9/2007 | Muto ................... | C04B 35/4682 361/321.4 |
| 7,314,841 B2 | * | 1/2008 | Takada ................... | C03C 3/15 501/32 |
| 8,518,528 B2 | * | 8/2013 | Chi ..................... | B01D 67/0046 266/216 |
| 2012/0052386 A1 | | 3/2012 | Ookita et al. | |
| 2012/0129016 A1 | | 5/2012 | Inagaki et al. | |

FOREIGN PATENT DOCUMENTS

| | | |
|---|---|---|
| CN | 102386416 | 3/2012 |
| JP | 11-40150 | 2/1999 |
| JP | 11-224676 | 8/1999 |
| JP | 2007-234233 | 9/2007 |
| JP | 2012-178327 | 9/2012 |
| JP | 2013-191296 | 9/2013 |
| WO | 2010/137154 | 12/2010 |

OTHER PUBLICATIONS

International Preliminary Report on Patentability dated Feb. 9, 2016 in International Application No. PCT/JP2014/070444 (English translation).
International Search Report dated Sep. 9, 2014 in International Application No. PCT/JP2014/070444.
Chinese Search Report with Chinese Office Action dated Mar. 3, 2017 in corresponding Chinese patent application No. 201480040734.0, with English translation.

* cited by examiner

*Primary Examiner* — Rena Dye Cronin
(74) *Attorney, Agent, or Firm* — Wenderoth, Lind & Ponack, L.L.P.

(57) ABSTRACT

A negative electrode active material for an electricity storage device of the present invention includes $TiO_2$, $Na_2O$, and a network-forming oxide.

7 Claims, 1 Drawing Sheet

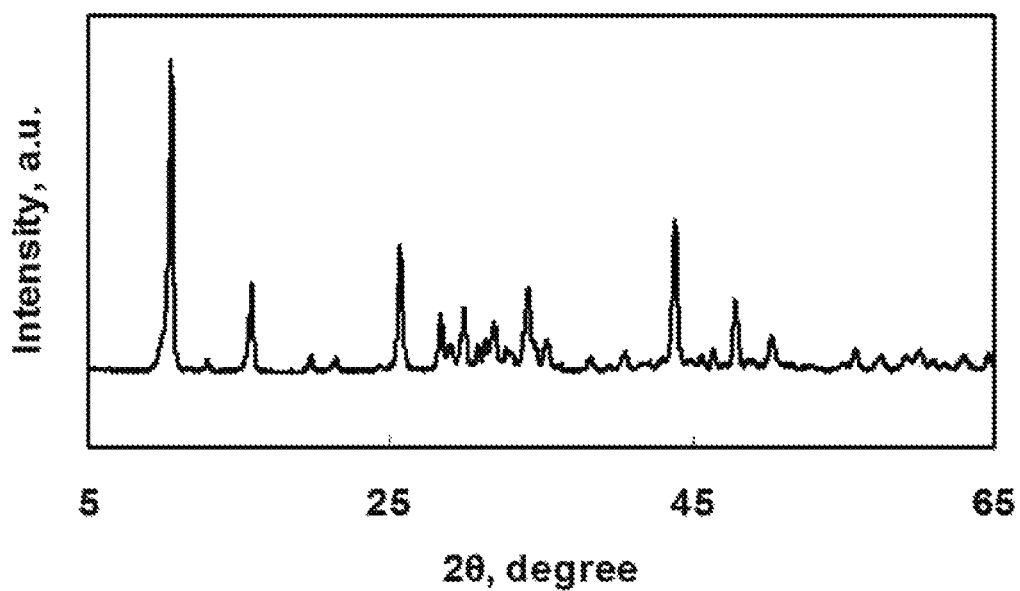

NEGATIVE ELECTRODE ACTIVE MATERIAL FOR ELECTRICITY STORAGE DEVICES AND METHOD FOR PRODUCING SAME

TECHNICAL FIELD

The present invention relates to a negative electrode active material for an electricity storage device to be used for portable electronic devices, electric vehicles, or the like, and to a method of producing the same.

BACKGROUND ART

In recent years, along with widespread use of portable personal computers and portable phones, it has been highly demanded to develop an electricity storage device, such as a lithium ion secondary battery, having a higher capacity and a reduced size. The electricity storage device having a higher capacity facilitates reduction in size of a battery, and hence the development of the electricity storage device having a higher capacity is urgently needed.

As a negative electrode active material for an electricity storage device, such as a lithium ion secondary battery or a sodium ion secondary battery, carbon materials, such as a graphite carbon material and hard carbon, have been generally used.

Further, as a negative electrode active material capable of storing and releasing lithium ions or sodium ions, layered sodium titanium oxide $Na_2Ti_3O_7$ has been proposed (see Patent Literature 1).

CITATION LIST

Patent Literature 1: JP 2007-234233 A

SUMMARY OF INVENTION

Technical Problem

However, the layered sodium titanium oxide $Na_2Ti_3O_7$ negative electrode active material has a problem of a low discharge capacity retention rate (low cycle performance).

Thus, an object of the present invention is to provide a negative electrode active material for an electricity storage device having a high discharge capacity retention rate, and a method of producing the same.

Solution to Problem

According to one embodiment of the present invention, there is provided a negative electrode active material for an electricity storage device, comprising $TiO_2$, $Na_2O$, and a network-forming oxide.

It is preferred that the network-forming oxide comprise $B_2O_3$.

It is preferred that the negative electrode active material for an electricity storage device according to the embodiment of the present invention comprise a monoclinic crystal containing Na, Ti, and O.

Further, it is preferred that the monoclinic crystal comprise a crystal belonging to a space group $P2_1/m$.

It is preferred that the negative electrode active material for an electricity storage device according to the embodiment of the present invention comprise an amorphous phase.

It is preferred that the negative electrode active material for an electricity storage device according to the embodiment of the present invention comprise, in terms of mol % on an oxide basis, 10% to 75% of $TiO_2$, 10% to 50% of $Na_2O$, and 0.1% to 50% of the network-forming oxide.

It is preferred that the negative electrode active material for an electricity storage device according to the embodiment of the present invention further comprise 0.1% to 25% of $ZnO+SnO+MnO_2+Nb_2O_5+Sb_2O_3+Bi_2O_3$.

It is preferred that the negative electrode active material for an electricity storage device according to the embodiment of the present invention be in a form of particles, the particles each having a surface covered with conductive carbon.

A method of producing a negative electrode active material for an electricity storage device according to one embodiment of the present invention comprises the steps of: (1) preparing a batch containing $TiO_2$, $Na_2O$, and a network-forming oxide; (2) melting the batch to obtain molten glass; and (3) cooling the molten glass to obtain a melt-solidified body.

It is preferred that the method of producing a negative electrode active material for an electricity storage device according to the embodiment of the present invention further comprise the steps of: (4) pulverizing the obtained melt-solidified body to obtain melt-solidified body powder; and (5) firing the melt-solidified body powder at from 500° C. to 1000° C. to obtain crystallized glass powder.

Further, it is preferred that the step (5) comprise firing the melt-solidified body powder in an inert atmosphere or a reductive atmosphere after adding one or both of an organic compound and conductive carbon to the melt-solidified body powder.

Advantageous Effects of Invention

According to the embodiments of the present invention, the negative electrode active material for an electricity storage device having a high discharge capacity retention rate and the method of producing the same can be provided.

BRIEF DESCRIPTION OF DRAWINGS

FIG. 1 is an X-ray diffraction pattern of a negative electrode active material of Example 1.

DESCRIPTION OF EMBODIMENTS

A negative electrode active material for an electricity storage device of the present invention comprises $TiO_2$, $Na_2O$, and a network-forming oxide.

$TiO_2$ is a redox component serving as a drive force for charge and discharge. The content of $TiO_2$ is preferably from 10% to 75%, more preferably from 20% to 70%, still more preferably from 30% to 65%, particularly preferably from 40% to 60%. When the content of $TiO_2$ is excessively small, the discharge capacity of the negative electrode active material tends to lower. Meanwhile, when the content of $TiO_2$ is excessively large, crystals of different kinds other than a monoclinic crystal containing Na, Ti, and O are liable to precipitate to increase the electrode potential of the negative electrode active material.

$Na_2O$ is a component for improving lithium ion and sodium ion conductivity. The content of $Na_2O$ is preferably from 10% to 50%, more preferably from 15% to 45%, still more preferably from 20% to 42%, particularly preferably from 25% to 40%. When the content of $Na_2O$ is excessively small, the discharge capacity of the negative electrode active material tends to lower, and rapid charge-discharge performance tend to lower. Meanwhile, when the content of $Na_2O$ is excessively large, chemical durability is liable to lower.

The network-forming oxide is an oxide capable of forming a three-dimensional irregular network structure, that is, an amorphous phase by the oxide alone, and specific examples thereof include $B_2O_3$, $SiO_2$, $P_2O_5$, and $GeO_2$. The network-forming oxide has effects of making it easy for the negative electrode active material to comprise an amorphous phase and improving the lithium ion and sodium ion conductivity. The content of the network-forming oxide is preferably from 0.1% to 50%, more preferably from 1% to 40%, still more preferably from 3% to 30%, particularly preferably from 5% to 20%. When the content of the network-forming oxide is excessively small, the lithium ion and sodium ion conductivity is liable to lower. Meanwhile, when the content of the network-forming oxide is excessively large, the discharge capacity of the negative electrode active material tends to lower.

The content of $B_2O_3$ is preferably from 0.1% to 50%, more preferably from 1% to 40%, particularly preferably from 3% to 30%. When the content of $B_2O_3$ is excessively small, the lithium ion and sodium ion conductivity is liable to lower. Meanwhile, when the content of $B_2O_3$ is excessively large, the chemical durability tends to lower.

The content of $SiO_2$ is preferably from 0% to 40%, more preferably from 1% to 30%, particularly preferably from 3% to 20%. When the content of $SiO_2$ is excessively large, the discharge capacity of the negative electrode active material tends to lower.

The content of $P_2O_5$ is preferably from 0% to 25%, more preferably from 1% to 20%, particularly preferably from 3% to 15%. When the content of $P_2O_5$ is excessively small, the lithium ion and sodium ion conductivity lowers, and the rapid charge-discharge performance are liable to lower. Meanwhile, when the content of $P_2O_5$ is excessively large, the chemical durability is liable to lower.

The content of $GeO_2$ is preferably from 0% to 40%, more preferably from 1% to 30%, particularly preferably from 3% to 20%. When the content of $GeO_2$ is excessively large, the discharge capacity of the negative electrode active material tends to lower.

Further, the negative electrode active material for an electricity storage device of the present invention may comprise ZnO, SnO, MnO, $Nb_2O_5$, $Sb_2O_3$, or $Bi_2O_3$. When the negative electrode active material for an electricity storage device of the present invention comprises one or more of those components, electron conductivity increases, and the rapid charge-discharge performance improve easily. The total content of the above-mentioned components is preferably from 0.1% to 25%, particularly preferably from 0.2% to 10%. When the total content of the components is excessively large, the crystals of different kinds, which are not involved in charge and discharge of an electricity storage device, are generated, and the discharge capacity of the negative electrode active material is liable to lower.

It is preferred that the negative electrode active material for an electricity storage device of the present invention comprise a monoclinic crystal containing Na, Ti, and O. When the negative electrode active material for an electricity storage device of the present invention comprises the monoclinic crystal containing Na, Ti, and O, there is a tendency that the electrode potential of the negative electrode active material decreases while the discharge capacity increases. The monoclinic crystal containing Na, Ti, and O is preferably a crystal belonging to a space group $P2_1/m$, more preferably a crystal represented by the general formula: $Na_xTi_yO_{(x/2+2y)}$ ($1 \leq x \leq 3$, $2 \leq y \leq 4$), particularly preferably a $Na_2Ti_3O_7$ crystal.

It is preferred that the negative electrode active material for an electricity storage device of the present invention comprise an amorphous phase. When the negative electrode active material for an electricity storage device of the present invention comprises the amorphous phase, the lithium ion and sodium ion conductivity of the negative electrode active material improves, and hence the rapid charge-discharge performance improves easily.

Further, it is preferred that the negative electrode active material for an electricity storage device of the present invention be formed of crystallized glass. When the negative electrode active material for an electricity storage device of the present invention is formed of crystallized glass, the monoclinic crystal containing Na, Ti, and O and the amorphous phase can form a composite easily, and hence both the discharge capacity and the rapid charge-discharge performance of the negative electrode active material tend to improve.

It is preferred that the crystallinity of the monoclinic crystal containing Na, Ti, and O in the negative electrode active material be 30 mass % or more, 40 mass % or more, particularly 50 mass % or more. When the crystallinity of the monoclinic crystal containing Na, Ti, and O is excessively low, the discharge capacity tends to lower. It should be noted that the upper limit of the crystallinity is not particularly limited, but realistically, the crystallinity is 99 mass % or less.

The crystallinity of the monoclinic crystal containing Na, Ti, and O is determined by carrying out peak separation to each crystalline diffraction line and an amorphous halo in a diffraction line profile ranging from 10° to 60° in terms of a 2θ value obtained by powder X-ray diffraction measurement using CuKα rays. Specifically, when an integral intensity obtained by carrying out the peak separation of a broad diffraction line (amorphous halo) in the range of from 10° to 45° from a total scattering curve obtained by performing background subtraction from the diffraction line profile is defined as Ia, the total sum of integral intensities obtained by carrying out the peak separation of each crystalline diffraction line derived from the monoclinic crystal containing Na, Ti, and O detected in the range of from 10° to 60° from the total scattering curve is defined as Ic, and the total sum of integral intensities obtained from other crystalline diffraction lines is defined as Io, the content Xc of the crystal is determined on the basis of the following equation:

$$Xc=[Ic/(Ic+Ia+Io)] \times 100(\%)$$

As the crystallite size of the monoclinic crystal containing Na, Ti, and O is smaller, the average particle diameter of negative electrode active material particles can be reduced more, and electric conductivity can be improved more. Specifically, it is preferred that the crystallite size of the monoclinic crystal containing Na, Ti, and O be 100 nm or less, particularly 80 nm or less. The lower limit of the crystallite size is not particularly limited, but realistically, the crystallite size is 1 nm or more, further 10 nm or more. The crystallite size is determined in accordance with a Scherrer equation based on the analysis results of powder X-ray diffraction.

Further, it is preferred that the negative electrode active material for an electricity storage device of the present invention be in a form of particles, the particles each having a surface covered with conductive carbon, in other words, each surface of the particles being covered with conductive carbon. When each surface of the particles is covered with conductive carbon, the electron conductivity increases, and the rapid charge-discharge performance improves easily.

It is preferred that the average particle diameter of the negative electrode active material be from 0.1 μm to 20 μm, from 0.3 μm to 15 μm, particularly from 0.5 μm to 50 μm. When the average particle diameter of the negative electrode active material is excessively small, the aggregation force between the negative electrode active material particles becomes strong, and the negative electrode active material particles are not dispersed easily when the negative electrode active material is formed into a paste. As a result, the internal resistance of a battery increases, and a discharge voltage is liable to decrease. Further, an electrode density decreases, and the discharge capacity per unit volume of the battery tends to lower. Meanwhile, when the average particle diameter of the negative electrode active material is excessively large, the specific surface area of the negative electrode active material is liable to be reduced, and the lithium ion and sodium ion conductivity at an interface between the negative electrode active material and an electrolyte tends to lower. Further, the surface smoothness of an electrode tends to be degraded.

It should be noted that, in the present invention, the average particle diameter means D50 (volume-based average particle diameter) and refers to a value measured by a laser diffraction scattering method.

It is preferred that the content of carbon in the negative electrode active material for an electricity storage device of the present invention be from 0.01 mass % to 20 mass %, from 0.05 mass % to 20 mass %, from 1 mass % to 20 mass %, from 2 mass % to 15 mass %, particularly from 3 mass % to 12 mass %. When the content of carbon is excessively small, the covering with a carbon-containing layer becomes insufficient, and the electron conductivity tends to be poor. Meanwhile, when the content of carbon is excessively large, the content of the negative electrode active material particles relatively decreases, and the discharge capacity per unit mass of the negative electrode active material tends to lower.

In the negative electrode active material for an electricity storage device of the present invention, it is preferred that, in Raman spectroscopy, a ratio (D/G) of a peak intensity D at from 1300 $cm^{-1}$ to 1400 $cm^{-1}$ with respect to a peak intensity G at from 1550 $cm^{-1}$ to 1650 $cm^{-1}$ be 1 or less, particularly 0.8 or less, and a ratio (F/G) of a peak intensity F at from 800 $cm^{-1}$ to 1100 $cm^{-1}$ with respect to the peak intensity G be 0.5 or less, particularly 0.1 or less. When those peak intensity ratios satisfy the above-mentioned ranges, the electron conductivity of the negative electrode active material tends to increase.

A method of producing a negative electrode active material for an electricity storage device of the present invention comprises the steps of: (1) preparing a batch containing $TiO_2$, $Na_2O$, and a network-forming oxide; (2) melting the batch to obtain molten glass; and (3) cooling the molten glass to obtain a melt-solidified body. When the negative electrode active material is produced by such melting method, a negative electrode active material in which each constituent component is homogeneously dispersed is obtained easily.

It is sufficient that the melting temperature be appropriately adjusted so as to melt the raw material batch homogeneously. Specifically, it is preferred that the melting temperature be 700° C. or more, particularly 900° C. or more. The upper limit of the melting temperature is not particularly limited. However, when the melting temperature is excessively high, energy is lost, and hence it is preferred that the melting temperature be 1500° C. or less, particularly 1400° C. or less.

Further, as the step of obtaining a melt-solidified body, besides the foregoing, a sol-gel process, a chemical vapor deposition synthesis process, such as a process involving spraying solution mist into flames, a mechanochemical process, or the like is also applicable.

It is preferred that the method of producing a negative electrode active material for an electricity storage device of the present invention further comprise the steps of: (4) pulverizing the obtained melt-solidified body to obtain melt-solidified body powder; and (5) firing the melt-solidified body powder at from 500° C. to 1000° C. to obtain crystallized glass powder.

A method of pulverizing the melt-solidified body is not particularly limited, and general pulverizers, such as a ball mill, a bead mill, and an attritor, may be used.

It is preferred that the average particle diameter of the melt-solidified body powder be smaller, since the total specific surface area of the negative electrode active material becomes large, and ions and electrons are exchanged easily.

The heat treatment temperature of the melt-solidified body powder is not particularly limited because the heat treatment temperature varies depending on the composition of the melt-solidified body. It is preferred that the lower limit of the heat treatment temperature be 500° C., 550° C., particularly 600° C. or more. When the heat treatment temperature is excessively low, the precipitation of the monoclinic crystal containing Na, Ti, and O becomes insufficient, and there is a possibility in that the discharge capacity may lower. Meanwhile, it is preferred that the upper limit of the heat treatment temperature be 1000° C., 950° C., particularly 900° C. It is not preferred that the heat treatment temperature be excessively high, because there is a possibility in that the monoclinic crystal containing Na, Ti, and O may be dissolved.

The heat treatment time is appropriately adjusted so that the precipitation of the monoclinic crystal containing Na, Ti, and O proceeds sufficiently. Specifically, it is preferred that the heat treatment time be from 0.5 hour to 20 hours, from 1 hour to 15 hours, particularly from 8 hours to 12 hours.

Further, it is preferred that the step (5) comprise firing the melt-solidified body powder in an inert atmosphere or a reductive atmosphere after adding one or both of an organic compound and conductive carbon to the melt-solidified body powder. With this, the surfaces of the negative electrode active material particles can be covered with the carbon-containing layer.

As the conductive carbon, there are given graphite, acetylene black, amorphous carbon, and the like. It should be noted that, as for amorphous carbon, it is preferred that a C—O bond peak or a C—H bond peak causing a decrease in conductivity of the negative electrode active material be not substantially detected in the amorphous carbon in FT-IR analysis. As the organic compound, there are given a carboxylic acid, such as an aliphatic carboxylic acid or an aromatic carboxylic acid, glucose, an organic binder, a surfactant, and the like.

The addition amount of the one or both of the organic compound and the conductive carbon is preferably from 0.01 pts. mass to 50 pts. mass, more preferably from 0.1 pts. mass to 50 pts. mass, still more preferably from 1 pts. mass to 30 pts. mass, particularly preferably from 5 pts. mass to 20 pts. mass with respect to 100 pts. mass of precursor glass powder. When the addition amount of the one or both of the organic compound and the conductive carbon is excessively small, it becomes difficult to cover the surfaces of the negative electrode active material particles with the carbon-containing layer sufficiently. When the addition amount of the one or both of the organic compound and the conductive carbon is excessively large, the thickness of the carbon-containing layer increases to prevent the movement of lithium ions and sodium ions, and the discharge capacity tends to lower.

A negative electrode for an electricity storage device according to the present invention can be produced by adding a conductive agent and a binder to the above-mentioned negative electrode active material, suspending the resultant in water or a solvent, such as N-methylpyrrolidone, to form a slurry, and applying the slurry onto a current collector, such as an aluminum foil or a copper foil, followed by drying and pressing, to thereby form the resultant into a strip shape.

The conductive agent is a component to be added for achieving rapid charge and discharge. Specific examples thereof include highly conductive carbon black, such as acetylene black or ketjen black, graphite, and coke. Of those, it is preferred to use highly conductive carbon black which exhibits excellent conductivity with in a very small amount of addition.

As the binder, there are given, for example: a thermoplastic linear polymer, such as polytetrafluoroethylene (PTFE), polyvinylidene fluoride (PVDF), fluorine-based rubber, or styrene-butadiene rubber (SBR); a thermosetting resin, such as thermosettingpolyimide, polyamideimide, polyamide, a phenol resin, an epoxy resin, a urea resin, a melamine resin, an unsaturated polyester resin, or polyurethane; and a water-soluble polymer, such as a cellulose derivative, e.g., carboxymethylcellulose (also including a carboxymethylcellulose salt, such as sodium carboxymethylcellulose, the same holds true for the following), hydroxypropylmethylcellulose, hydroxypropylcellulose, hydroxyethylcellulose, ethylcellulose, or hydroxymethylcellulose, polyvinyl alcohol, polyacrylamide, polyvinylpyrrolidone, or copolymers thereof.

It is preferred that the blending ratio of the negative electrode active material, the conductive agent, and the binder is in a range of 70 wt % to 95 wt % of the negative electrode active material, 3 wt % to 20 wt % of the conductive agent, and 2 wt % to 20 wt % of the binder.

As the current collector, for example, an aluminum foil, an aluminum alloy foil, or a copper foil may be used. As the aluminum alloy, there is given an alloy formed of aluminum and an element such as magnesium, zinc, or silicon.

EXAMPLES

The present invention is described in detail by way of Examples below, but the present invention is not limited to these Examples.

Negative electrode active materials of Examples 1 and 2 were each produced as described below. Sodium carbonate ($Na_2CO_3$), titanium oxide ($TiO_2$), and boric acid anhydride ($B_2O_3$), serving as raw materials, were blended so as to have a composition shown in Table 1, to thereby prepare raw material powder. The raw material powder was melted in the atmosphere at 1300° C. for 1 hour. Then, molten glass was poured between a pair of rolls and formed into a film shape while being cooled quickly, to thereby produce a melt-solidified body.

The melt-solidified body thus obtained was pulverized with a ball mill for 20 hours and air-classified, to thereby obtain melt-solidified body powder having an average particle diameter of 2 μm.

The melt-solidified body powder thus obtained was subjected to heat treatment in the atmosphere at 800° C. for 1 hour, to thereby obtain a negative electrode active material. When the negative electrode active material was checked for a powder X-ray diffraction pattern, a diffraction line derived from a crystal shown in Table 1 was confirmed. An X-ray diffraction pattern of the negative electrode active material of Example 1 is shown in FIG. 1.

A negative electrode active material of Example 3 was produced as described below. Sodium carbonate ($Na_2CO_3$), titanium oxide ($TiO_2$), and boric acid anhydride ($B_2O$), serving as raw materials, were blended so as to have a composition shown in Table 1, to thereby prepare raw material powder. The raw material powder was melted in the atmosphere at 1300° C. for 1 hour. Then, molten glass was poured between a pair of rolls and formed into a film shape while being cooled quickly, to thereby produce a melt-solidified body.

The melt-solidified body thus obtained was pulverized with a ball mill for 20 hours and air-classified, to thereby obtain a negative electrode active material having an average particle diameter of 2 μm. When the negative electrode active material was checked for a powder X-ray diffraction pattern, a diffraction line derived from a crystal was not confirmed, and the negative electrode active material was found to be amorphous.

A negative electrode active material of Comparative Example 1 was produced as described below. Sodium carbonate ($Na_2CO_3$) and titanium oxide ($TiO_2$), serving as raw materials, were blended so as to have a composition shown in Table 1, to thereby prepare raw material powder. The raw material powder was pulverized and mixed with a ball mill and pelletized, followed by a solid-phase reaction in the atmosphere at 800° C. for 20 hours. Then, the treatments of the pulverization with the ball mill, the pelletization, and the solid-phase reaction in the atmosphere at 800° C. for 20 hours were performed again to obtain a negative electrode active material. When the negative electrode active material was checked for a powder X-ray diffraction pattern, a diffraction line derived from a crystal shown in Table 1 was confirmed.

The negative electrode active material for an electricity storage device, PVDF as a binder, and ketjen black as a conductive agent were weighed so as to satisfy the ratio of negative electrode active material:binder:conductive agent=80:15:5 (mass ratio), and these were dispersed in N-methylpyrrolidone (NMP), followed by sufficient stirring with a rotation-revolution mixer, to yield a slurry. Next, a doctor blade with a clearance of 100 μm was used to coat a copper foil having a thickness of 20 μm and serving as a negative electrode current collector with the resultant slurry, and the coated copper foil was dried at 80° C. with a dryer and was then passed through and pressed between a pair of rotating rollers at 1 t/cm², to yield an electrode sheet. An electrode punching machine was used to punch a piece having a diameter of 11 mm out of the electrode sheet, and the piece was dried at 140° C. for 6 hours, to yield a circular working electrode.

Next, the working electrode thus obtained was placed with its copper foil surface facing downward on a lower lid of a coin cell, and there were laminated, on the working electrode, a separator formed of a polypropylene porous film (Celgard #2400 manufactured by Hoechst Celanese Corporation) having a diameter of 16 mm, which had been dried under reduced pressure at 60° C. for 8 hours, and metal lithium serving as an opposite electrode, to produce a sodium ion secondary battery. Used as an electrolytic solution was a 1 M $NaPF_6$ solution/ethylene carbonate (EC): diethyl carbonate (DEC)=1:1 (volume ratio). It should be noted that the assembly of the test battery was carried out in an environment of a dew-point temperature of −70° C. or less.

The battery thus obtained was subjected to a charge-discharge test at 30° C. and measured for a discharge capacity and a discharge capacity retention rate. The results are shown in Table 1.

It should be noted that, in the charge-discharge test, charge (storage of sodium ions in a negative electrode active material) was carried out by constant current (CC) charge from 2 V to 0 V, and discharge (release of sodium ions from the negative electrode active material) was carried out by CC discharge from 0 V to 2 V. The C-rate was set to 0.1 C. The discharge capacity retention rate in the sodium ion secondary battery refers to a ratio of the discharge capacity at the 20th cycle with respect to the initial discharge capacity.

Further, the working electrode thus obtained was placed with its copper foil surface facing downward on a lower lid of a coin cell, and there were laminated, on the working electrode, a separator formed of a polypropylene porous film having a diameter of 16 mm, which had been dried under reduced pressure at 60° C. for 8 hours, and metal lithium serving as an opposite electrode, to produce a lithium ion secondary battery. Used as an electrolytic solution was a 1 M $LiPF_6$ solution/EC:DEC=1:1 (volume ratio). It should be noted that the assembly of the test battery was carried out in an environment of a dew-point temperature of −40° C. or less.

The battery thus obtained was subjected to a charge-discharge test at 30° C. and measured for a discharge capacity and a discharge capacity retention rate. The results are shown in Table 1.

It should be noted that, in the charge-discharge test, charge (storage of lithium ions in a negative electrode active material) was carried out by constant current (CC) charge from 2.5 V to 1.2 V, and discharge (release of sodium ions from the negative electrode active material) was carried out by CC discharge from 1.2 V to 2.5 V. The C-rate was set to 0.1 C. The discharge capacity retention rate in the lithium ion secondary battery refers to a ratio of the discharge capacity at the 10th cycle with respect to the initial discharge capacity.

TABLE 1

|  |  | Example | | | Comparative Example |
|---|---|---|---|---|---|
|  |  | 1 | 2 | 3 | 1 |
| Composition (mol %) | $Na_2O$ | 32.5 | 36 | 36 | 25 |
|  | $TiO_2$ | 52.5 | 49 | 49 | 75 |
|  | $B_2O_3$ | 15 | 15 | 15 |  |
| Precipitated crystal |  | $Na_2Ti_3O_7$, $NaBO_2$, $Na_3B_3O_6$ | $Na_2Ti_3O_7$, $NaBO_2$, $Na_{16}Ti_{10}O_{28}$ | Amorphous | $Na_2Ti_3O_7$ |

TABLE 1-continued

|  | Example | | | Comparative Example |
|---|---|---|---|---|
|  | 1 | 2 | 3 | 1 |
| Sodium ion secondary battery | | | | |
| Discharge capacity (mAh/g) | 122 | 102 | 87 | 112 |
| Discharge capacity retention rate (%) | 72 | 81 | 92 | 25 |
| Lithium ion secondary battery | | | | |
| Discharge capacity (mAh/g) | 51 | 51 | 48 | 45 |
| Discharge capacity retention rate (%) | 97 | 98 | 96 | 75 |

As described above, the negative electrode active materials produced in Examples 1 to 3 each contained $B_2O_3$ serving as a network-forming oxide, and hence in the sodium ion secondary battery, the discharge capacity was as high as from 87 $mAhg^{-1}$ to 122 $mAhg^{-1}$, and the discharge capacity retention rate was also as high as from 72% to 92%. Further, in the lithium ion secondary battery, the discharge capacity was as high as from 48 $mAhg^{-1}$ to 51 $mAhg^{-1}$, and the discharge capacity retention rate was as high as from 96% to 98%. Meanwhile, the negative electrode active material produced in Comparative Example 1 did not contain $B_2O_3$. Therefore, in the sodium ion secondary battery, although the discharge capacity was as high as 112 $mAhg^{-1}$, the discharge capacity retention rate was as low as 25%. Further, in the lithium ion secondary battery, the discharge capacity was 45 $mAhg^{-1}$, and the discharge capacity retention rate was 75%. Thus, both the discharge capacity and the discharge capacity retention rate were low.

The invention claimed is:

1. A negative electrode active material for an electricity storage device, comprising a composition containing $TiO_2$, $Na_2O$, and a network-forming oxide, and comprising a precipitated crystal of a monoclinic crystal containing Na, Ti, and O.

2. The negative electrode active material for an electricity storage device according to claim 1, wherein the network-forming oxide comprises $B_2O_3$.

3. The negative electrode active material for an electricity storage device according to claim 1, wherein the monoclinic crystal comprises a crystal belonging to a space group $P2_1/m$.

4. The negative electrode active material for an electricity storage device according to claim 1, further comprising an amorphous phase.

5. The negative electrode active material for an electricity storage device according to claim 1, comprising, in terms of mol % on an oxide basis, 10% to 75% of $TiO_2$, 10% to 50% of $Na_2O$, and 0.1% to 50% of the network-forming oxide.

6. The negative electrode active material for an electricity storage device according to claim 5, further comprising 0.1% to 25% of at least one selected from the group consisting of ZnO, SnO, $MnO_2$, $Nb_2O_5$, $Sb_2O_3$, and $Bi_2O_3$.

7. The negative electrode active material for an electricity storage device according to claim 1, wherein the negative electrode active material is in a form of particles, the particles each having a surface covered with conductive carbon.

* * * * *